United States Patent [19]

Lederman

[11] Patent Number: 4,901,833
[45] Date of Patent: Feb. 20, 1990

[54] COMBINED ROLLER CLUTCH CONTROL CAR AND SPRING

[75] Inventor: Frederick E. Lederman, Sandusky, Ohio

[73] Assignee: General Motors Corporation, Detroit, Mich.

[21] Appl. No.: 402,737

[22] Filed: Sep. 5, 1989

[51] Int. Cl.$^4$ ............................................. F16D 41/06
[52] U.S. Cl. ................................. 192/45; 188/82.84
[58] Field of Search ......................... 192/45, 44, 41 R; 188/82.84

[56] References Cited

U.S. PATENT DOCUMENTS 4,821,856 4/1989 Lederman ............................ 192/45

Primary Examiner—Allan D. Herrmann
Assistant Examiner—Andrea Pitts
Attorney, Agent, or Firm—Patrick M. Griffin

[57] ABSTRACT

A control car and energizing spring are combined into one component. The spring portion of the unit is sized and oriented relative to the control car portion in such a way that, as the unit is installed in a cage pocket, a prestress is created that tends to push the unit toward one side of the pocket. As the roller moves, the side thrust induced in the spring portion will counterbalance the prestress, keeping the car portion effectively centered in the pocket, and allowing the spring portion to perform effectively independently.

3 Claims, 3 Drawing Sheets

COMBINED ROLLER CLUTCH CONTROL CAR AND SPRING

This invention relates to overrunning roller clutches in general, and specifically to a roller clutch in which a control car and a particular type of energizing spring are combined into a single component.

BACKGROUND OF THE INVENTION

Two recent advances in overrunning roller clutch design by the assignee of the current invention provide significant improvement in two aspects of roller clutch operation. One recent development is the roller control car clutch, in which each roller is provided with an individual control car. The control car can provide roller skew and spin control, as well as much more secure roller shipping retention. It does, however, represent an additional component that must be handled and installed. Another recent development is an energizing spring that is specially designed and oriented so as to self protect its pleats from rubbing on the sides of the roller pocket. The V-shaped loops of the spring are tipped to one side when the spring is installed, and its rear leaf is deliberately made longer than the rest. When the spring compresses and expands, a side thrust is created, and the spring rear leaf slides into abutment with a side of the roller pocket. Thereafter, as the spring expands and contracts, the longer rear leaf keeps the spring pleats away from the side of the pocket. To work properly, a side thrust spring must be allowed to operate independently. That is, it must not be prevented by any other component from self seeking its equilibrium operating position, with its rear leaf abutted with the side of the pocket.

SUMMARY OF THE INVENTION

The invention provides a combined roller control car and energizing spring unit that integrates the basic advantages of the roller car and the side thrust spring into a single component. The unit is specially designed so that both the car and spring portion can effectively operate independently, despite being a single structure.

In a preferred embodiment, the invention is incorporated in an overrunning roller clutch with a cage having a series of generally box-shaped roller pockets arrayed about a central axis. Each pocket has a pair of axially opposed, parallel side rails, joined by at least one crossbar. A roller in each pocket travels back and forth as the clutch operates. A combined roller control car and energizing spring unit according to the invention is provided for each roller. Each unit is folded from a single blank of sheet spring steel, with a box-shaped car portion at the front, and an integral spring portion at the rear. The car portion is sized to closely contain a roller, moving with it as the roller travels. A predetermined maximum axial width clearance between the car portion of the unit and the pocket allows the car to move freely, assuming that nothing forces the car portion into the sides of the pocket. The spring portion of the unit is an accordion spring with a series of flat spring leaves joined at pleats to form V-shaped loops. In the free, unflexed state, the spring loops are tipped at an angle in one axial direction relative to the control car. The front spring leaf is integral with the car, while the free rear leaf is made deliberately longer than the other leaves. The angle of tip and longer rear leaf assures that, in the free state, the rear leaf extends axially outboard of the control car by more than the maximum car-pocket axial width clearance.

When the unit is installed in a pocket, it is assured that the rear spring leaf will abut one side of the pocket, while the other side of the car abuts the opposite side of the pocket. The spring will be flexed out of its free state to a small degree, creating a prestress in the unit that tends to keep the control car against the opposite side of the pocket. The car will not rub on that side, however, because as the spring compresses, a counterbalancing side thrust is induced that will tend to pull the car in the other axial direction, toward that side of the pocket that the spring rear leaf contacts. The maximum car-pocket clearance and amount of side thrust are such as to keep the car clear of either side of the pocket as the roller travels. Furthermore, the car will not pull the rear spring leaf away from contact with its side of the pocket, so the spring pleats will not rub. The control car and spring cooperate, in effect, so as to be able to provide their functions independently, in spite of being a single component.

It is, therefore, a general object of the invention to integrate a roller control car and side thrust accordion spring into one unit in such a way that each can still provide its particular function without interference from the other.

It is another object of the invention to orient and size the spring portion of the unit, relative to the control car portion of the unit, and relative to the axial width of the pocket, such that a post installation prestress and the side thrust in the spring portion will cooperate to prevent the car portion from rubbing, while at the same time the spring pleats are prevented from rubbing.

It is another object of the invention to extend the rear leaf of the side thrust type spring portion outboard of the car portion by a distance sufficiently greater than the maximum car-pocket axial clearance to assure that there will be enough post installation prestress created in the spring to balance the side thrust of the spring, and thereby keep the car centered between the sides of the pocket as the roller travels.

DESCRIPTION OF THE PREFERRED EMBODIMENT

These and other objects and features of the invention will appear from the following written description, and from the drawings, in which.

Figure 1:
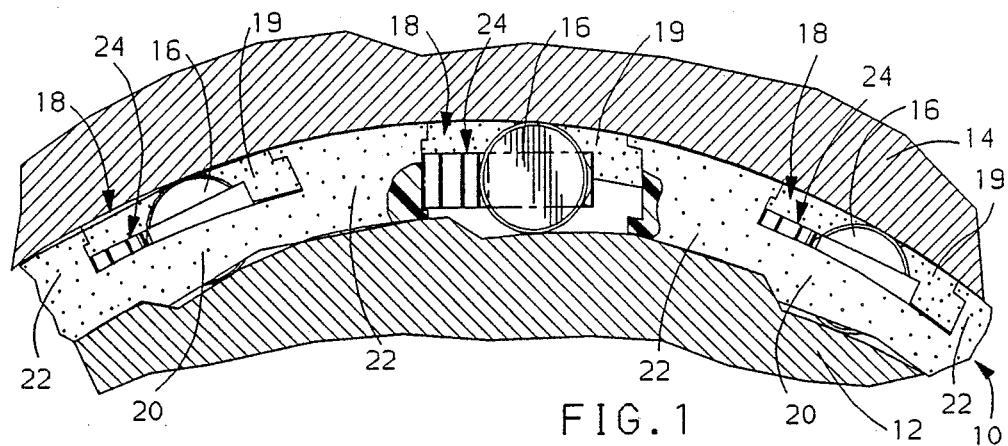
FIG. 1 is an end view of a portion of a roller clutch incorporating the invention as viewed along the central axis.
Figure 2:
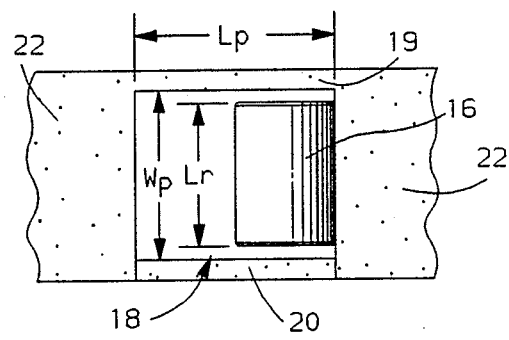
FIG. 2 is a plan view of a single pocket showing just the roller to illustrate the forwardmost, shipping position of the roller.
Figure 3:
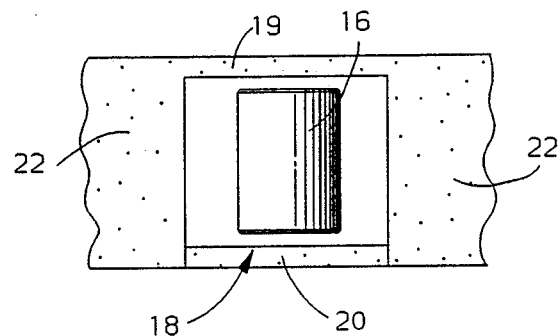
FIG. 3 is a view like 2, illustrating a nominal operating position of the roller.
Figure 4:
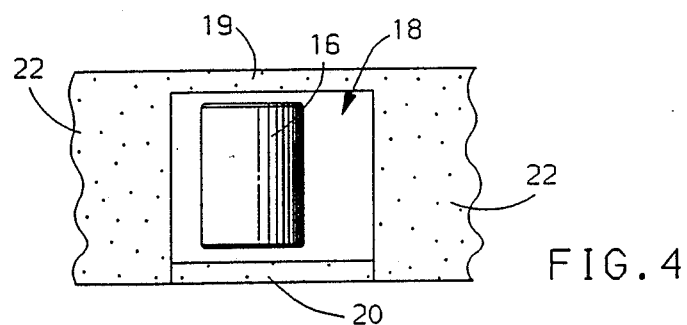
FIG. 4 is a view like 2, but illustrating the rearwardmost position of the roller.

Referring first to FIGS. 1 through 4, a preferred embodiment of an overrunning roller clutch incorporating the invention is indicated generally at 10. Like all roller clutches, clutch 10 is installed between a cam race 12 and a pathway race 14, and uses a series of rollers 16 to enforce selective relative rotation between the races 12 and 14. Clutch 10 has a basically conventional cage, which consists of a series of generally rectangular roller pockets, indicated generally at 18, arrayed about a central axis. Each pocket 18 is a box bounded by a pair of axially opposed, parallel side rails 19 and 20. The inner surfaces of side rails 19 and 20 lie in planes perpendicular to the central cage axis, axially separated by a width Wp. The side rails 19 and 20 are joined by crossbars 22, which act as journal blocks to keep the races 12 and 14 coaxial, but which allow some running eccentricity. The circumferential separation between the crossbars 22, which are grooved, is indicated at Lp. Roller 16 has a length Lr somewhat less than Wp, so that as clutch 10 operates, it can move or travel freely back and forth in its pocket 18, compensating for any running eccentricity. Prior to clutch installation, each roller 16 is retained in a shipping position, against the crossbar 22 in front of it, as illustrated in FIG. 2. This represents the forwardmost position of roller 16, although not a position that it attains during clutch operation. A nominal operating position is shown in FIG. 3. FIG. 4 shows the rearwardmost position that a roller 16 would achieve during clutch operation. As each roller 16 travels, it is accompanied by an individual combined control car and energizing spring unit according to the invention, indicated generally at 24, details of which are described next.

Figure 5:
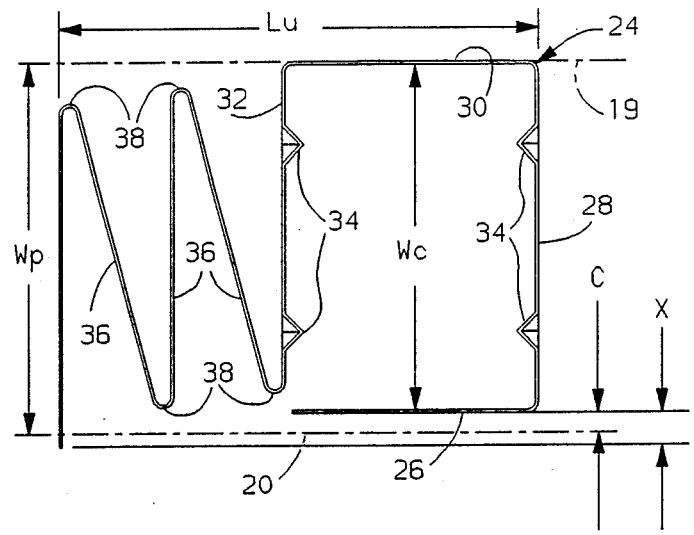
FIG. 5 is a view of the combined car and spring unit of the invention in the free, unflexed condition, and illustrating its size and orientation relative to the axial width of a pocket.
Figure 10:
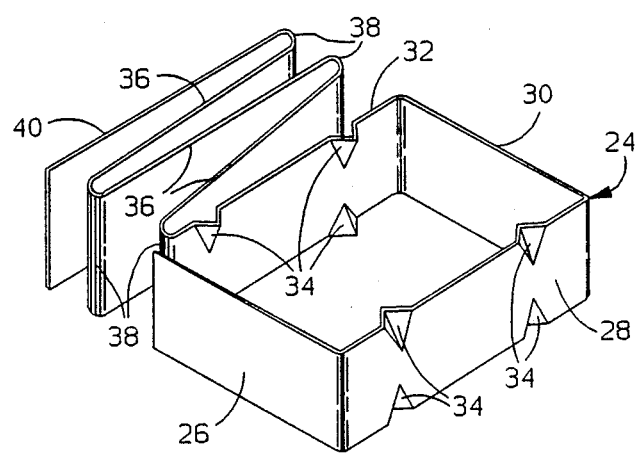
FIG. 10 is perspective view of the unit.

Referring next to FIGS. 5 and 10, each unit 24 is folded from a single blank of spring quality sheet steel, the same type of steel from which a conventional spring would be made. The control car portion at the front of unit 24, like pocket 18, is box-shaped, with a free side wall 26, front wall 28, integral side wall 30, and rear wall 32. The front and rear walls 28 and 32 are stamped with four indentations 34 apiece. The axial width measured between the side walls 26 and 30, indicated at Wc, is slightly greater than the roller length Lr, but still slightly less than the pocket width Wp, giving a maximum axial clearance C. The circumferential separation of the front and rear walls 28 and 32 is substantially equal to the diameter of a roller 16. The rest of the spring steel blank is folded into an accordion type energizing spring portion at the rear of unit 24. Specifically, a dead front spring leaf, which comprises the control car rear wall 32, is joined to a series of three flat intermediate spring leaves 36 at four pleats 38, terminating in a free rear leaf 40. The intermediate leaves 36 are the same length, while rear leaf 40 is longer. The V-shaped loops formed by the leaves 36 and pleats 38 are tipped in one axial direction, at an acute angle. The combination of tipping the spring loops and making the rear leaf 40 longer assures that, in the free or unflexed state, rear leaf 40 extends axially outboard of the control car side wall 26 by a distance X greater than the clearance C. The total free state length of unit 24, Lu, is somewhat greater than Lp, for a reason described next.

Figure 6:
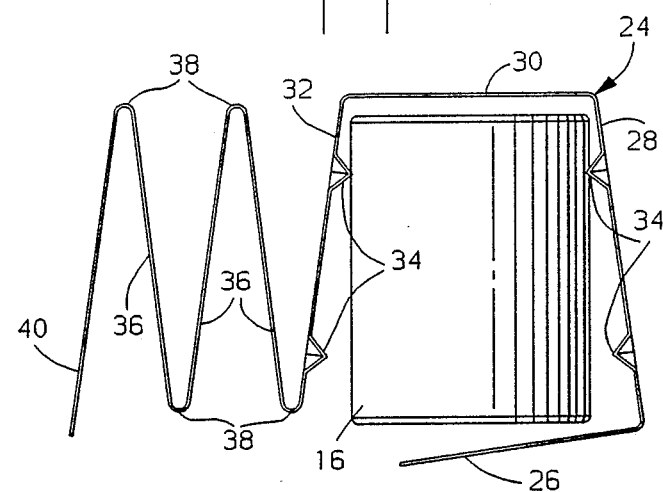
FIG. 6 is a view showing how a roller is added to the unit to create a subassembly.

Referring next to FIGS. 1, 2, 6 and 7, it may be seen how the particular shape and size of unit 24 described above operates. The open corner design allows a roller 16 to be easily pressed into unit 24, parting the front and rear walls 28 and 32, which flex about the integral side wall 30, as shown in FIG. 6. The spring steel is resilient enough that the walls spring back to their original shape, retaining roller 16 securely between the indentations 34 to give a subassembly that can be easily handled and installed. When the subassembly is installed in a pocket 18, the fact that Lu is greater than Lp assures that front wall 28 and rear leaf 40 will be biased between the grooved, opposed crossbars 22 during shipping, the position of roller 16 shown in FIGS. 2 and 7. Since the spring portion and control car portion of unit 24 are integrated at the shared rear wall 32, it cannot slip off of roller 16, so high biasing forces are not as necessary for secure shipping retention. Unit 24 has maximum compactness, as well, since there is no structure separating the control car and spring portion. The free state location of rear leaf 40 assures that it will abut side rail 20, and will be pushed inboard from its free state position, see FIG. 7. At the same time, the integral side wall 30 will be pushed against side rail 19. The entire spring portion will be deflected to an extent from its free state, which is shown in dotted lines for purposes of comparison.

Figure 7:
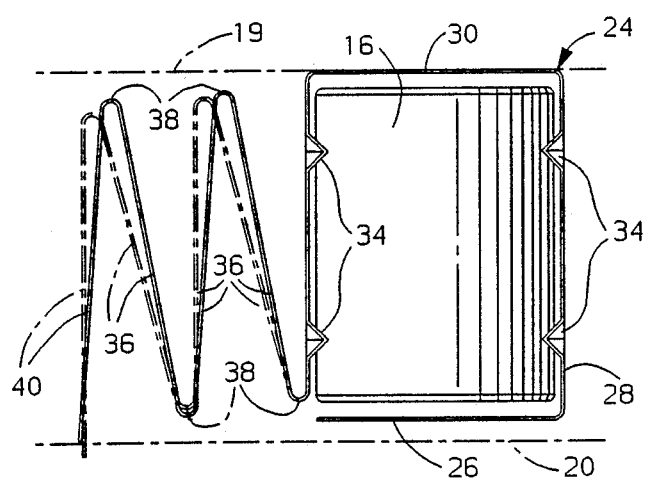
FIG. 7 is a view of the subassembly of FIG. 6 installed in a pocket, with the roller in the FIG. 2 position, and showing the post installation, prestressed state of the spring portion in solid lines and the preinstallation state in solid lines.
Figure 8:
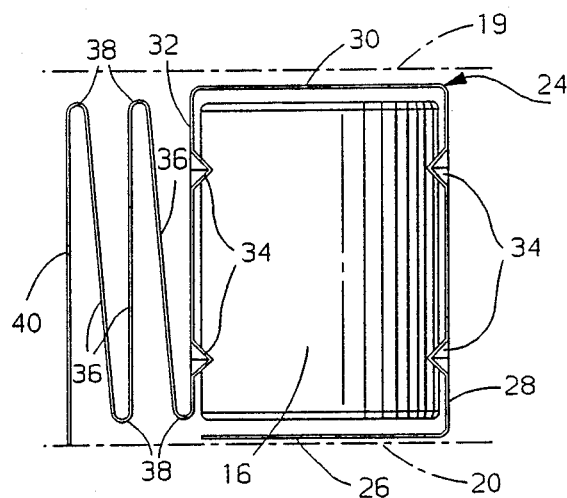
FIG. 8 is a view of like 7, but showing the FIG. 3 position of the roller.

Referring next to FIGS. 7 and 8, the post installation prestress in unit 24 caused by its deflection from the free state is not a large force, but will tend to keep the control car integral side wall 30 against pocket side rail 19, in the absence of a countervailing force. If side wall 30 were to remain in continual contact with side rail 19 as roller 16 traveled back and forth, it would rub and wear. However, a counterbalancing force is created by virtue of the angle of tip of the spring portion of unit 24. As roller 16 moves toward the crossbar 22 and the spring portion of unit 24 compresses, an axial side thrust is induced that opposes the prestress. The side thrust pulls side wall 30 away from side rail 19, toward a more centered position within pocket 18, as shown in FIG. 8.

Figure 9:
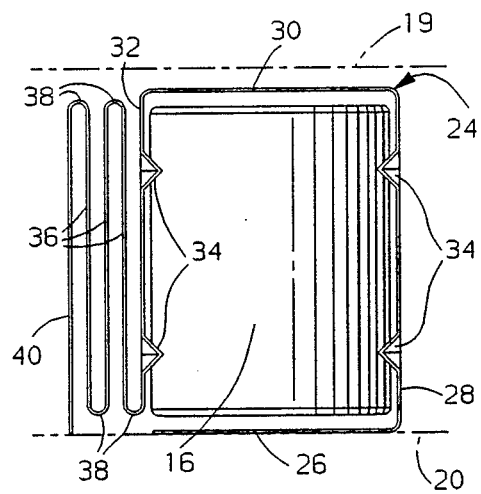
FIG. 9 is a view like 7, but showing the FIG. 4 position of the roller.

Referring next to FIG. 9, as roller 16 moves farther back, the side thrust moves side wall 26 closer to pocket side rail 20. At the rearwardmost position of roller 16, side wall 26 will have moved almost against rail 20, but that position is one only rarely achieved during normal clutch operation. So, the net result of the prestress and countervailing side thrust on unit 24 is that, during normal roller travel, the control car portion operates, in effect, independently of the spring portion. In fact, not only does it operate without interference, it actually operates with potentially less bumping of the side walls 26 and 30 on the pocket side rails 19 and 20 than would occur with a free floating control car. Likewise, the spring pleats 38 are continually held away from, and protected from wear against, the side rail 20 by the longer rear leaf 40. The contact of rear leaf 40 with side rail 20 is not jeopardized. So, the spring portion operates without interference from the control car portion. An additional benefit is that the spring pleats 38 are totally protected from contact with the races 12 and 14, since the spring portion cannot pop off of roller 16. In conclusion, the many benefits of a unitary structure are obtained without loss of the functions that separate control cars and springs would provide.

Variations of the embodiment disclosed could be made. The spring and control car portions of unit 24 could be separately manufactured, then joined, as by welding. However, folding the unit 24 from one blank is simpler, and the spring steel is an excellent material for the control car portion. This is especially true for the open corner design shown, which allows roller 16 to be added as shown in FIG. 6. A releasable latch could be used to hold the front wall 28 very securely during shipping, if desired, which would have no effect on the operation of unit 24 post installation. Therefore, it will be understood that it is not intended to limit the invention to just the embodiment disclosed.

The embodiments of the invention in which an exclusive property or privilege is claimed are defined as follows:

1. For use in an overrunning roller clutch of the type that has a series of generally box-shaped roller pockets disposed circumferentially about a central axis, each pocket having a pair of axially opposed parallel side rails between which a roller moves circumferentially back and forth as said clutch operates, a combined roller control car and energizing spring unit, comprising, a generally box-shaped control car portion within which a roller may be retained so as to move therewith as said clutch operates, said control car being sized so as to fit between said pocket side rails with a predetermined axial clearance, and, an accordion spring portion having a series of spring leaves including a front spring leaf formed integrally with said control car portion, intermediate leaves forming a series of V-shaped loops, and a free rear leaf, said spring loops, in a free state, being tipped at an angle in one axial direction relative to said control car portion, said rear leaf further being sufficiently longer than said intermediate spring leaves so as to extend axially outboard of said control car portion in said one axial direction by more than said predetermined axial clearance, whereby, when said unit is installed in a respective pocket, said spring portion rear leaf contacts one pocket side rail so as to flex said spring portion out of its free state in the opposite axial direction to create a post installation prestress on said control car portion toward the opposite pocket side rail, and when said roller and control car portion moves as said clutch operates to compress said spring portion, a side thrust in said one axial direction opposed to said prestress will be induced on said control car portion, by virtue of said angle of tip, thereby allowing said spring portion and control car portion to operate substantially independently, as said spring portion longer rear leaf prevents said loops from rubbing on said one pocket side rail.

2. An overrunning roller clutch, comprising, a plurality of generally box-shaped roller pockets disposed circumferentially about a central axis, each pocket having a pair of axially opposed, parallel side rails, a plurality of rollers, one respective to each pocket, said rollers moving circumferentially back and forth between said pocket side rails as said clutch operates, a plurality of combined roller control car and energizing spring units, comprising, a generally box-shaped control car portion within which a respective roller may be retained so as to move with said respective roller as said clutch operates, said control car being sized so as to fit between said pocket side rails with a predetermined axial clearance, and, an accordion spring portion having a series of spring leaves including a front spring leaf formed integrally with said control car portion, intermediate leaves forming a series of V-shaped loops, and a free rear leaf, said spring loops, in a free state, being tipped at an angle in one axial direction relative to said control car portion, said rear leaf further being sufficiently longer than said intermediate spring leaves so as to extend axially outboard of said control car portion in said one axial direction by more than said predetermined axial clearance, whereby, when said unit is installed in a pocket, said spring portion rear leaf contacts one pocket side rail so as to flex said spring portion out of its free state in the opposite axial direction to create a post installation prestress on said control car portion toward the opposite pocket side rail, and when said roller and control car portion move as said clutch operates to compress said spring portion, a side thrust in said one axial direction opposed to said prestress will be induced on said control car portion, by virtue of said angle of tip, thereby allowing said spring portion and control car portion to operate substantially independently, as said spring portion longer rear leaf prevents said loops from rubbing on said one pocket side rail.

3. For use in an overrunning roller clutch of the type that has a series of generally box-shaped roller pockets disposed circumferentially about a central axis, each pocket having a pair of axially opposed, parallel side rails between which a roller moves circumferentially back and forth as said clutch operates, a combined roller control car and energizing spring unit, said unit comprising, a generally box-shaped spring steel control car portion within which a roller may be resiliently fitted so as to move therewith during clutch operation, said control car being sized so as to fit between said pocket side rails with a predetermined axial clearance, and, an accordion spring portion formed integrally with said control car portion, said spring portion having a series of flat spring leaves including a front spring leaf formed integrally with said control car portion, intermediate leaves forming a series of V-shaped loops, and a free rear leaf, said spring loops, in a free state, being tipped at an angle in one axial direction relative to said control car portion, said rear leaf further being sufficiently longer than said intermediate spring leaves so as to extend axially outboard of said control car portion in said one axial direction by more than said predetermined axial clearance, whereby, when said unit is installed in a pocket, said spring portion rear leaf contacts one pocket side rail so as to flex said spring portion out of its free state in the opposite axial direction to create a post installation prestress on said control car portion toward the opposite pocket side rail, and when said roller and control car portion move as said clutch operates to compress said spring portion, a side thrust in said one axial direction opposed to said pre stress will be induced on said control car portion, by virtue of said angle of tip, thereby allowing said spring portion and control car portion to operate substantially independently, as said spring portion longer rear leaf prevents said loops from rubbing on said one pocket side rail.

* * * * *